United States Patent
Beaucoup et al.

(10) Patent No.: US 6,990,193 B2
(45) Date of Patent: Jan. 24, 2006

(54) METHOD OF ACOUSTIC ECHO CANCELLATION IN FULL-DUPLEX HANDS FREE AUDIO CONFERENCING WITH SPATIAL DIRECTIVITY

(75) Inventors: Franck Beaucoup, Dunrobin (CA); Michael Tetelbaum, Ottawa (CA)

(73) Assignee: Mitel Knowledge Corporation, Ottawa (CA)

(*) Notice: Subject to any disclaimer, the term of this patent is extended or adjusted under 35 U.S.C. 154(b) by 230 days.

(21) Appl. No.: 10/306,154

(22) Filed: Nov. 29, 2002

(65) Prior Publication Data

US 2004/0125942 A1 Jul. 1, 2004

(51) Int. Cl.
*H04M 1/00* (2006.01)

(52) U.S. Cl. .............. 379/406.01; 379/388.04; 381/92

(58) Field of Classification Search ........... 379/406.01, 379/388.04; 381/92
See application file for complete search history.

(56) References Cited

U.S. PATENT DOCUMENTS

| 5,646,991 | A | 7/1997 | Sih |
| 6,768,723 | B1 | 7/2004 | Popovic et al. |
| 2002/0015500 | A1 * | 2/2002 | Belt et al. .............. 379/406.01 |

OTHER PUBLICATIONS

Chapter 13 of *Microphone Arrays. Signal Processing Techniques and Applications* by Michael Branstein and Daren Ward, published by Springer Verlag. 2001, pp. 281–306.
W. Herbordt and W. Kellermann. *Limits for Generalized Sidelob Cancellers with Embedded Acoustic Echo Cancellation*. In Proc. Int. Conference on Acoustics, Speech and Signal Processing (ICASSP), Salt Lake City, USA, May 2001, 4 pgs.
H. Buchner, W. Herbordt and W. Kellermann. *An Efficient Combination of Multi–Channel Acoustic Echo Cancellation With a Beamforming Microphone Array*. Conf. Rec. International Workshop on Hands–free Speech Communication (HSC 2001), Kyoto, Japan, Apr. 2001. 4 pp.

* cited by examiner

*Primary Examiner*—Jefferey F. Harold
(74) *Attorney, Agent, or Firm*—Antonelli, Terry, Stout & Kraus, LLP.

(57) ABSTRACT

A method is set forth of controlling an acoustic echo canceller at the output of a beamformer in an audio conferencing device. Information is saved to, and retrieved from, memory that characterizes each of a finite number of look directions, or regions of focus, covering the entire spatial span of the conferencing device. Each time a change occurs from a first look direction to a second look direction, information relating to the workspace captured by the acoustic echo canceller is saved for the first look direction, and previously saved information for the second look direction is retrieved from memory. The acoustic echo cancellation then takes place for the second look direction with the retrieved information.

5 Claims, 3 Drawing Sheets

METHOD OF ACOUSTIC ECHO CANCELLATION IN FULL-DUPLEX HANDS FREE AUDIO CONFERENCING WITH SPATIAL DIRECTIVITY

FIELD OF THE INVENTION

The present invention relates in general to microphone arrays, and more particularly to acoustic echo cancellation in a microphone array with spatial directivity.

BACKGROUND OF THE INVENTION

Spatial directivity in audio conferencing systems can be achieved either through directional microphones or through proper combination of several omni-directional microphones (referred to as microphone array technology).

Beamforming may be used to discriminate a source position in a "noisy" environment by "weighting" or modifying the gain of the signal from each microphone to create a beam in a desired "look" direction toward the source (i.e. talker).

For full-duplex operation, acoustic echo cancellation must be performed to prevent reverberation, howling, etc. One approach is to perform acoustic echo cancellation on all of the microphone signals in parallel. However, this approach is computationally intensive since it requires as many acoustic echo cancellers running in parallel, as there are microphones in the conferencing device. Another approach is to perform acoustic echo cancellation on only one signal: the spatially filtered signal at the output of the beamformer (i.e. the output signal of the particular microphone facing the "look direction" at any given point in time).

The challenge that this second approach presents to acoustic echo cancellation is accommodating variations in the characteristics of this directional signal that vary with the spatial area that the system is pointing to. For example, the acoustic echo-path as well as the room characteristics (background noise, etc) may change suddenly as the system changes its look direction, for instance when switching to a different talker. As a result, the acoustic echo cancellation algorithm re-converges to the new characteristics (for instance new echo path) each time the system changes its look direction. These transitions result in under-performance of the system in terms of acoustic echo cancellation.

There are methods known in the prior art to combine multi-microphone directionality (beamforming) and acoustic echo cancellation. These generic structures presented in:

1. Chapter 13 of *Microphone Arrays. Signal Processing Techniques and Applications* by Michael Branstein and Darren Ward, published by Springer Verlag. 2001
2. W. Herbordt and W. Kellermann. Limits for Generalized Sidelob Cancellers with Embedded Acoustic Echo Cancellation. In Proc. Int. Conference on Acoustics, Speech, and Signal Processing (ICASSP), Salt Lake City, USA, May, 2001
3. H. Buchner, W. Herbordt and W. Kellermann. An Efficient Combination of Multi-Channel Acoustic Echo Cancellation With a Beamforming Microphone Array. Conf. Rec. International Workshop on Hands-free Speech Communication (HSC 2001), Kyoto, Japan, April 2001.

The method set forth in reference [1], above, performs acoustic echo cancellation on the microphone signals (one AEC per microphone) such that the microphone signals inputs to the beamformer are clear of echo. In this structure, the AECs operates without any repercussion from the beamformer and the beamformer is undisturbed by acoustic echoes so that both functional blocks perform as expected. However, this approach requires multi-channel acoustic echo cancellation and therefore is computationally demanding.

A computationally more effective structure places the AEC behind a beamformer, as set forth in reference [2], above. With this method only one acoustic echo canceller is required. However in this case the beamformer is a part of the echo path impulse response that the AEC has to model (i.e. adapt to). If the beamformer has to track multiple (or moving) sources, which is common for teleconferencing, then the AEC is challenged by the sudden changes in the echo impulse response every time the beamformer switches to the new local source (i.e. talker). This may result in poor echo cancellation until the AEC is re-adapted to the new echo path.

To overcome the problem of time variations in the echo path when the acoustic echo cancellation is performed after beamforming a compromised structure is suggested in reference [3], above. In this method, acoustic echo cancellation is performed at the outputs of N fixed beamformers (where N<Number of microphones in the array) covering N look directions. The signals passed to the time-varying beamformer are clear of echo and therefore able to react to newly active local sources and/or interferences. This structure is a compromised solution between the first and the second ones (i.e. references [1] and [2]), however it still requires multi-channel acoustic echo cancellation that is not computationally efficient. One object of the present invention is to improve performance of the acoustic echo cancellation that operates on spatially filtered signals while preserving low computational cost.

SUMMARY OF THE INVENTION

According to the present invention, a single acoustic echo canceller is provided at the output of the beamformer. However, information is saved to (and retrieved from) memory that characterizes each of a finite number of look directions, or regions of focus, covering the entire spatial span of the conferencing device. Each time a change occurs from a first look direction to a second look direction, information relating to the workspace captured by the full-duplex acoustic echo cancellation algorithm is saved for the first look direction, and previously saved information for the second look direction is retrieved from memory. The acoustic echo cancellation then takes place for the new region of focus (i.e. the second look direction) with the retrieved information.

The exact information contained in the workspace is not essential to the present invention but may include echo path coefficients that characterize the model of the echo path for each particular region of focus, as well as any other information that is useful to the full-duplex acoustic echo cancellation algorithm. For instance, information regarding the background noise (level and frequency contents) can be included, as well as information regarding the optimal speed of adaptation, the level of the residual echo to be masked by the NLP (non-linear processor) block, etc.

BRIEF DESCRIPTION OF THE DRAWINGS

A detailed description of the invention is provided herein below, with reference to the following drawings, in which.

DETAILED DESCRIPTION OF THE PREFERRED EMBODIMENT

Figure 1:
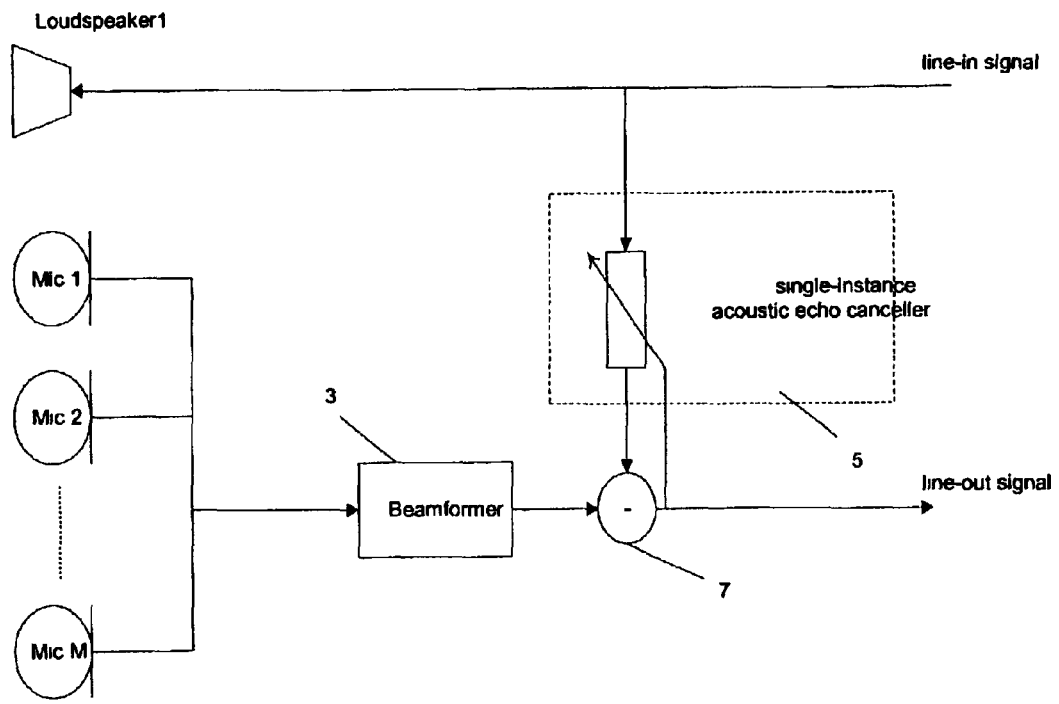
FIG. 1 is a block diagram of a microphone array with acoustic echo cancellation on the directional signal as is known from the prior art.

FIG. 1 shows a microphone array with acoustic echo cancellation on the directional signal as is known from the prior art. A remote audio signal (line-in signal) is received and applied to a loudspeaker 1. A plurality of microphones (Mic 1, Mic 2 . . . Mic M) are connected to a beamformer 3 of well-known design. An acoustic echo canceller 5 provides a replica of the acoustic echo path, and the output thereof is subtracted in a subtractor 7 from the output of beamformer 3 to provide an echo-free spatially directed microphone signal to the telephone line (line-out signal). The spatial span of the microphone array is divided into a finite number of regions such that, at any given time, the look direction of the system is in one these regions.

Figure 2:
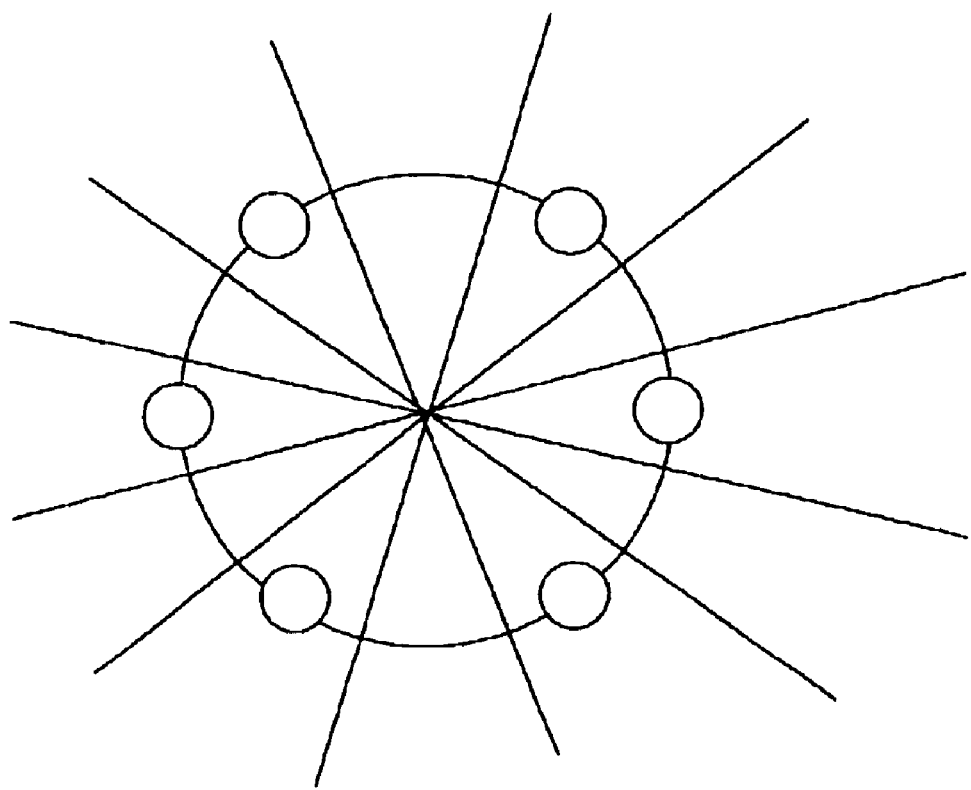
FIG. 2 is a schematic representation of a circular microphone array with 12 sectors.

FIG. 2 shows the microphones (Mic 1, Mic 2 . . . Mic 6) configured as a circular microphone array with N=12 sectors, each 30-degree wide, to cover a 360-degree span or field of view.

Figure 3:
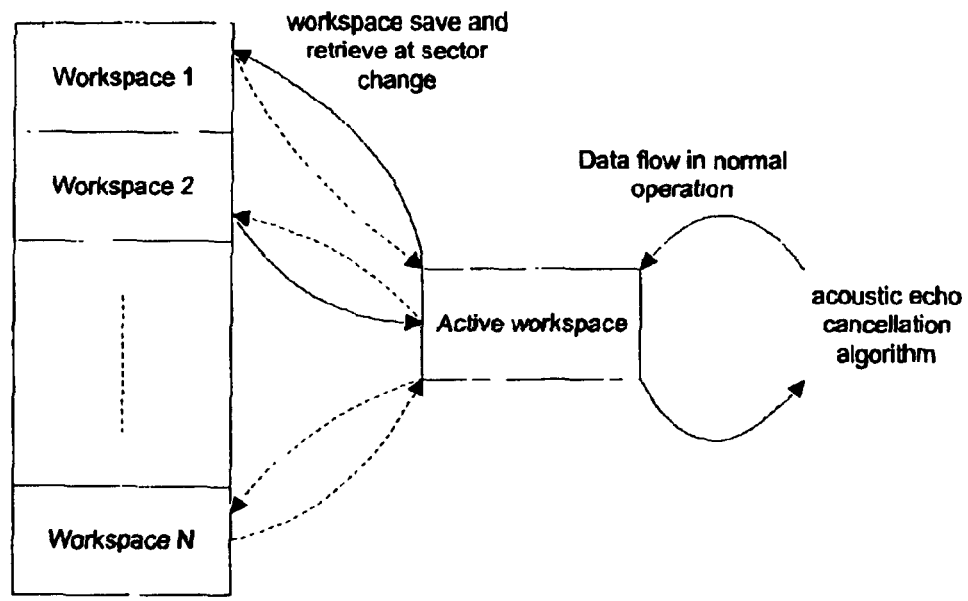
FIG. 3 is a schematic illustration of a memory structure for transferring information relative to workspaces in accordance with the present invention.

At system initialization, a memory area is reserved corresponding to N times the size of the workspace holding the information to be saved. When the look direction of the beamformer changes from one sector to another, the system saves to memory the information, or workspace, relative to the current sector, and retrieves from memory the previously saved workspace relative to the new sector. FIG. 3 illustrates the memory organization relative to these workspaces.

Figure 4:
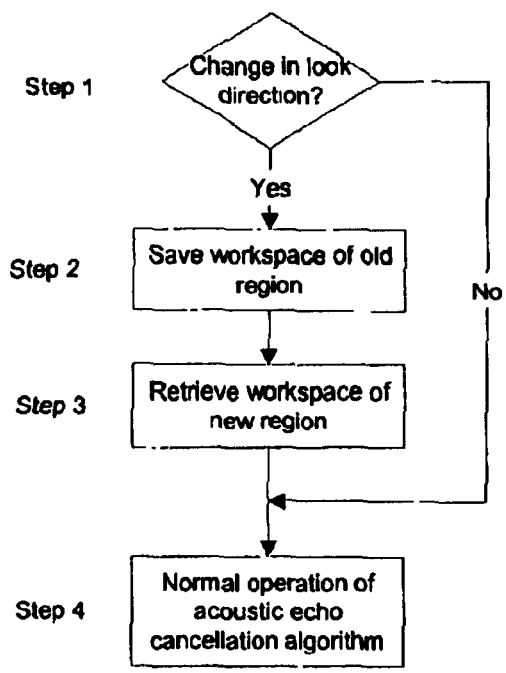
FIG. 4 is a flowchart showing a method for saving and retrieving workspace information in the microphone array of FIG. 1, according to the present invention.

FIG. 4 is a flow chart showing the method according to the present invention. Thus, with reference to Step 1 and 2 of FIG. 4, in response to a change in look direction of the beamformer 3 (e.g. from sector 4 to sector 5 in FIG. 2), the relevant information for sector 4 (e.g. echo coefficients, etc.) is captured in the Active Workspace and transferred to a memory location associated with sector 4 (e.g. Workspace 4). In general, any mechanism to trigger the capture of relevant information (e.g. acoustic coefficients) is possible. One method to trigger the capture of acoustic coefficients for a single echo path is described in U.S. patent application Ser. No. 09/453,147, the contents of which are incorporated herein by reference. Next, at Step 3, the information previously stored for the new look direction (i.e. Sector 5) is retrieved from the associated memory location (i.e. Workspace 5) and written into the Active Workspace. The retrieved information in the Active Workspace is then used by the echo canceller 5 to quickly converge based on the retrieved characteristics, and echo cancellation proceeds as usual (Step 4).

A person skilled in the art may conceive of variations or modifications of the invention. For example, the information for a particular region of focus (i.e. sector) may have to be captured at more judicious times than the time when the change occurs since the information provided by the system may not be entirely reliable at arbitrary points in time. For example, the echo canceller 5 may be in a slightly diverged condition due to double-talk. Furthermore, the mechanism for capturing relevant information is not limited to the implementations set forth in U.S. patent application Ser. No. 09/453,147, the contents of which are incorporated herein by reference. Another contemplated implementation uses a pointer to map directly the Workspace for the currently active region onto the Active Workspace from the global pool of Workspaces allocated in memory. In such an implementation, when a change of region of focus occurs, the current Workspace pointer changes to point to the Workspace corresponding to the new spatial region, thus avoiding copying the Workspace contents back and forth. Finally, as indicated above, the exact content of the Workspaces that are saved to and retrieved from memory may vary (e.g. echo path coefficients, information regarding the background noise (level and frequency contents), information regarding the optimal speed of adaptation, the level of the residual echo to be masked by the NLP (non-linear processor) block, etc).

All such variations and modifications are believed to be within the sphere and scope of the present invention.

We claim:

1. A method of operating a full duplex speakerphone having a microphone array controlled by a beamformer to orient a beam from said microphone array in selected multiple look directions, and an acoustic echo canceller for canceling echo from said beamformer in accordance with information relevant to said multiple look directions, said method comprising the steps of:

a) capturing and storing said information relevant to said multiple look directions in respective locations of a memory, each of said locations being associated with a corresponding one of said multiple look directions; and b) in response to a beamformer change from a current one of said look directions to a new look direction then retrieving from a memory location associated with said new look direction information that is relevant to said new look direction.

2. The method of claim 1, wherein said information is captured to an active workspace from which said information is stored to said respective locations of memory.

3. The method of claim 1, wherein said information includes at least one of echo path coefficients, level and frequency contents of background noise, data relating to optimal speed of adaptation, and level of residual echo.

4. The method of claim 1, wherein said information relevant to respective ones of said multiple look directions is stored when said beamformer orients said beam to said respective selected multiple look directions.

5. The method of claim 1, wherein said information relevant to respective ones of said multiple look directions is stored in said respective locations of memory immediately prior to a change in orientation of said beam.

* * * * *